(12) United States Patent
Popovich et al.

(10) Patent No.: US 9,274,349 B2
(45) Date of Patent: Mar. 1, 2016

(54) LASER DESPECKLER BASED ON ANGULAR DIVERSITY

(75) Inventors: Milan Momcilo Popovich, Leicester (GB); Jonathan David Waldern, Los Altos Hills, CA (US)

(73) Assignee: DIGILENS INC., Sunnyvale, CA (US)

( * ) Notice: Subject to any disclaimer, the term of this patent is extended or adjusted under 35 U.S.C. 154(b) by 222 days.

(21) Appl. No.: 14/009,637

(22) PCT Filed: Apr. 10, 2012

(86) PCT No.: PCT/GB2012/000331
§ 371 (c)(1),
(2), (4) Date: Oct. 8, 2013

(87) PCT Pub. No.: WO2012/136970
PCT Pub. Date: Oct. 11, 2012

(65) Prior Publication Data
US 2014/0022616 A1 Jan. 23, 2014

Related U.S. Application Data

(60) Provisional application No. 61/457,482, filed on Apr. 7, 2011.

(51) Int. Cl.
*G02B 5/32* (2006.01)
*G03H 1/04* (2006.01)
*G02B 27/48* (2006.01)
(Continued)

(52) U.S. Cl.
CPC ............... *G02B 27/48* (2013.01); *G02B 5/0252* (2013.01); *G02B 5/32* (2013.01); *G02F 1/13342* (2013.01); *G02F 1/133371* (2013.01);
(Continued)

(58) Field of Classification Search
None
See application file for complete search history.

(56) References Cited

U.S. PATENT DOCUMENTS 5,751,452 A 5/1998 Tanaka et al.
5,942,157 A 8/1999 Sutherland et al.
(Continued)

FOREIGN PATENT DOCUMENTS

JP 11142806 5/1999
WO 2007015141 2/2007
(Continued)

OTHER PUBLICATIONS

International Search Report for PCT/GB2012/000331, Completed by the European Patent Office on Aug. 29, 2012, 4 Pages.
(Continued)

*Primary Examiner* — Jade R Chwasz
(74) *Attorney, Agent, or Firm* — Brooks Kushman P.C.

(57) ABSTRACT

A device for reducing laser speckle using a micro scanner and a holographic diffuser. The micro scanner includes a first transparent optical substrate with an input surface and an output surface and a second transparent optical substrate with an input surface and an output surface and a variable refractive index medium sandwiched between the output surface of the first substrate and the input surface of the second substrate. Transparent electrodes are applied to the output surface of the first substrate and the input surface of the second substrate. The electrodes are coupled to a voltage generator. The input surface of the first substrate is optically coupled to a laser source. The input surface of the second substrate is configured as an array of prismatic elements. At least one of the input surface of the first substrate or the output surfaces of the second substrate is planar.

16 Claims, 8 Drawing Sheets

(51) Int. Cl.
  *G02B 5/02* (2006.01)
  *G02F 1/1334* (2006.01)
  *G02F 1/1333* (2006.01)
  *G02F 1/29* (2006.01)
  *G02F 1/1335* (2006.01)

(52) U.S. Cl.
  CPC ......... *G02F 1/292* (2013.01); *G02F 1/133606* (2013.01); *G02F 2203/22* (2013.01)

(56) References Cited

U.S. PATENT DOCUMENTS 8,224,133 B2    7/2012    Popovich et al.
2002/0047837 A1*    4/2002    Suyama et al. ............... 345/204
2007/0070476 A1*    3/2007    Yamada et al. ................. 359/9

FOREIGN PATENT DOCUMENTS

| WO | 2009013597 | 1/2009 |
| WO | 2010023444 | 3/2010 |
| WO | 2011055109 | 5/2011 |

OTHER PUBLICATIONS

Scott Giancola. Physical Optics Corporation 2003, "Holographic Diffuser, Makes Light Work of Screen Tests." 3 Pages.

* cited by examiner

LASER DESPECKLER BASED ON ANGULAR DIVERSITY

CROSS-REFERENCE TO RELATED APPLICATION

This application is the U.S. national phase of PCT Application No. PCT/GB2012/000331 filed on Apr. 10, 2012, which claims the benefit of U.S. Provisional Application No. 61/457,482 filed on Apr. 7, 2011, the disclosures of which are incorporated in their entirety by reference herein.

CROSS REFERENCE TO RELATED APPLICATIONS

This application incorporates by reference in their entireties PCT Application No. PCT/IB2008/001909 with international filing date 22 Jul. 2008 entitled LASER ILLUMINATION DEVICE and PCT Application No. PCT/GB2010/002041 filed on 2 Nov. 2010 entitled DESPECKLER USING ANGULAR AND PHASE DIVERSITY.

BACKGROUND OF THE INVENTION

The present invention relates to an illumination device, and more particularly to a laser illumination device based on electrically switchable Bragg gratings that reduces laser speckle.

Miniature solid-state lasers are currently being considered for a range of display applications. The competitive advantage of lasers in display applications results from increased lifetime, lower cost, higher brightness and improved colour gamut. Laser displays suffer from speckle, a sparkly or granular structure seen in uniformly illuminated rough surfaces. Speckle arises from the high spatial and temporal coherence of lasers. Speckle reduces image sharpness and is distracting to the viewer.

Several approaches for reducing speckle contrast have been proposed based on spatial and temporal decorrelation of speckle patterns. More precisely, speckle reduction is based on averaging multiple sets of speckle patterns from a speckle surface resolution cell with the averaging taking place over the human eye integration time. Speckle may be characterized by the parameter speckle contrast which is defined as the ratio of the standard deviation of the speckle intensity to the mean speckle intensity. Temporally varying the phase pattern faster than the eye temporal resolution destroys the light spatial coherence, thereby reducing the speckle contrast. Traditionally, the simplest way to reduce speckle has been to use a rotating diffuser to direct incident light into randomly distributed ray directions. The effect is to produce a multiplicity of speckle patterns while maintaining a uniform a time-averaged intensity profile. This type of approach is often referred to as angle diversity. Another approach known as polarization diversity relies on averaging phase shifted speckle patterns. In practice neither approach succeeds in eliminating speckle entirely.

It is known that speckle may be reduced by using an electro optic device to generate variations in the refractive index profile of material such that the phase fronts of light incident on the device are modulated in phase and or amplitude. The published International Patent Application No. WO/2007/015141 entitled LASER ILLUMINATOR discloses a despeckler based on a new type of electro optical device known as an electrically Switchable Bragg Grating (SBG). An (SBG) is formed by recording a volume phase grating, or hologram, in a polymer dispersed liquid crystal (PDLC) mixture. Typically, SBG devices are fabricated by first placing a thin film of a mixture of photopolymerizable monomers and liquid crystal material between parallel glass plates. Techniques for making and filling glass cells are well known in the liquid crystal display industry. One or both glass plates support electrodes, typically transparent indium tin oxide films, for applying an electric field across the PDLC layer. A volume phase grating is then recorded by illuminating the liquid material with two mutually coherent laser beams, which interfere to form the desired grating structure. During the recording process, the monomers polymerize and the HPDLC mixture undergoes a phase separation, creating regions densely populated by liquid crystal micro-droplets, interspersed with regions of clear polymer. The alternating liquid crystal-rich and liquid crystal-depleted regions form the fringe planes of the grating. The resulting volume phase grating can exhibit very high diffraction efficiency, which may be controlled by the magnitude of the electric field applied across the PDLC layer. When an electric field is applied to the hologram via transparent electrodes, the natural orientation of the LC droplets is changed causing the refractive index modulation of the fringes to reduce and the hologram diffraction efficiency to drop to very low levels. Note that the diffraction efficiency of the device can be adjusted, by means of the applied voltage, over a continuous range from near 100% efficiency with no voltage applied to essentially zero efficiency with a sufficiently high voltage applied. U.S. Pat. No. 5,942,157 and U.S. Pat. No. 5,751,452 describe monomer and liquid crystal material combinations suitable for fabricating SBG devices. An SBG device typically comprises at least one SBG element that has a diffracting state and a non-diffracting state. Typically, the SBG element is configured with its cell walls perpendicular to an optical axis. An SBG element diffracts incident off-axis light in a direction substantially parallel to the optical axis when in said active state. However, each SBG element is substantially transparent to said light when in said inactive state. An SBG element can be designed to diffract at least one wavelength of red, green or blue light. SBGs may be stacked to provide independently switchable layers.

SBGs with Bragg grating pitches much smaller than the operating wavelength exhibit form birefringence in other words they behave like a negative uniaxial crystal with an optic axis perpendicular to the Bragg planes. They are referred to as sub-wavelength gratings. The incident wave cannot resolve the sub-wavelength structures and sees only the spatial average of its material properties. Only zero order forward and backward "diffracted" waves propagate and all higher diffracted orders are evanescent. The birefringence is switched off when the refractive indices of the PDLC and polymer planes are equal. The retardance of a sub wavelength grating is defined as the difference between the extraordinary and ordinary refractive indices multiplied by the grating thickness. As will be discussed later subwavelength gratings can be used to provide a variable refractive index medium.

There are two types of speckle known as objective speckle and subjective speckle. Objective speckle occurs as a two dimensional random pattern on a projection screen and has the effect of degrading the resolution of the projected image. Subjective speckle manifests itself as floating light spots that the eye cannot focus on. It does not affect the image on the screen surface. Classical methods for overcoming speckle rely on the principle of randomly displacing a diffusing surface relative to the laser illumination beam. The relative displacement is usually provided by a rotating diffusing screen. Another equivalent solution is to have a static diffusing screen and a means for scanning the laser illumination across the screen. However, such approaches have failed to deliver the levels of speckle contrast reduction required by modern laser display technology. Mechanical scanning solutions also suffer from the problems of mechanical and optical design complexity, noise and cost of implementation. There is a need for a compact solid state solution to the problem of speckle reduction using the principle of angular diversity.

There is a requirement for a despeckler with improved speckle contrast reduction.

SUMMARY OF THE INVENTION

It is a first object of the present invention to provide a despeckler with improved speckle contrast reduction.

In one embodiment of the invention there is provided a device for reducing laser speckle comprising: a micro scanner and a holographic diffuser.

The micro scanner device comprises: a first transparent optical substrate with an input surface and an output surface; a second transparent optical substrate with an input surface and an output surface and a variable refractive index medium sandwiched between the output surface of the first substrate and the input surface of the second substrate. Transparent electrodes are to applied to the output surface of the first substrate and the input surface of the second substrate. The electrodes are coupled to a voltage generator. The input surface of the first substrate is optically coupled to a laser source. The input surface of the second substrate is configured as an array of prismatic elements containing surfaces. Advantageously, at least one of the input surface of the first substrate or the output surfaces of the second substrate is planar.

At least one of said transparent electrodes is patterned into independently addressable electrode elements. The average refractive index of any region of said variable refractive index medium is proportional to the voltage applied across the electrode elements sandwiching said region. The micro scanner deflects input light from the laser source into output light at an angle determined by the refractive index of the substrates and the average refractive index of the variable refractive index medium. The voltage applied across each electrode element is varied temporally. Each point in the holographic diffuser diffracts incident light rays of a predefined angle into output light rays having a predefined range of angles to form a diffuse illumination patch.

In one embodiment of the invention a despeckler according to the principles of the invention comprises a micro scanner and a holographic diffuser. The micro scanner is illuminated by light from a laser which is expanded and collimated by the beam coupling optics. The micro scanner deflects the beam in small angular sweeps of random amplitude. The holographic diffuser then diffracts light to form a diffuse illumination patch.

In one embodiment of the invention the despeckler further comprises a beam steering means for directing the output ray angles from the micro-scanner into the input angles required by the holographic diffuser. Advantageously the beam steering means is a diffractive device based on Bragg gratings.

In one embodiment of the invention a projector incorporating the despeckler further comprises a microdisplay, a projection lens, and a screen, which is observed from an eye position.

In one embodiment of the invention at least two micro scanners of identical prescriptions are provided. The micro scanners are stacked and operated independently.

In one embodiment of the invention the beam coupling optics comprises a TIR lightguide. A coupling grating admits collimated light from the laser into a TIR path. A second coupling grating directs light into the micro scanner. A TIR lightguide may be used to couple in light from RGB laser sources or multiple monochromatic sources.

In one embodiment of the invention the holographic diffuser is a Computer Generated Hologram (CGH).

In one embodiment of the invention the holographic diffuser is recorded into a Holographic Polymer Dispersed Liquid Crystal (HPDLC).

In one embodiment of the invention the holographic diffuser also encodes the properties of beam shaping and homogenization.

In one embodiment of the invention illustrated in there is provided a despeckler for used with a reflective display which further comprise a polarizing beamsplitter and a quarter wave plate. Linearly polarized light from the laser is transmitted through the micro scanner, beam coupling optics and holographic diffuser illumination light which is transmitted through the polarizing beamsplitter transmitted through the quarter wave plate reflected at the microdisplay and transmitted once again through the quartet wave plate emerging with polarization orthogonal to that of the incident light and is then reflected at the polarizing beam splitter towards a projection lens. In the case of a liquid crystal display panel the quarter wave plate will not be required.

In one embodiment of the invention the micro scanner is polarization sensitive.

In one embodiment of the invention both of the transparent electrodes in the micro scanner are continuous. The variable index material is selectively switched in discrete steps from a fully diffracting to a non diffracting state by an electric field applied across the transparent electrodes.

In one embodiment of the invention at least one of the transparent electrodes in the micro scanner is patterned to provide independently switchable electrode elements such that portions of the variable index material may be selectively switched from a diffracting to a non diffracting state by an electric field applied across the transparent electrodes. Desirably, the electrodes are fabricated from ITO.

In one embodiment of the invention the electrode elements in the micro scanner have substantially the same cross sectional area as a prismatic element.

In one embodiment of the invention the centre of said electrode element in the micro scanner overlaps the vertex of a prismatic element.

In one embodiment of the invention the centre of an electrode element in the micro scanner is offset from the vertex of a prismatic element.

In one embodiment of the invention the prism array in the micro scanner is a linear array of elements of triangular cross section.

In one embodiment of the invention the prism array in the micro scanner is a two-dimensional array comprising pyramidal elements.

In one embodiment of the invention the prismatic elements in the micro scanner are identical.

In one embodiment of the invention the surface angles of the prismatic elements in the micro scanner have a random distribution.

In one embodiment of the invention the prismatic elements in the micro scanner are each characterised by one of at least two different surface geometries.

In one embodiment of the invention the prismatic elements in the micro scanner are each characterised by one of at least two different surface geometries with the prismatic elements of a given surface geometry being distributed uniformly across the prism array.

In one embodiment of the invention the prismatic elements in the micro scanner have diffusing surfaces.

In one embodiment of the invention the variable refractive index medium is a subwavelength grating.

In one embodiment of the invention the variable refractive index medium is a HPDLC material.

In one embodiment of the invention the variable refractive index medium is a SBG.

In one embodiment of the invention the laser source comprises red green and blue emitters.

In one embodiment of the invention the micro scanner further comprises a beam shaping diffuser.

In one embodiment of the invention the micro scanner further comprises a beam collimating lens.

In one embodiment of the invention the micro scanner further comprises a beam shaping diffuser and at least one beam collimating lens.

A more complete understanding of the invention can be obtained by considering the following detailed description in conjunction with the accompanying drawings wherein like index numerals indicate like parts. For purposes of clarity details relating to technical material that is known in the technical fields related to the invention have not been described in detail.

DETAILED DESCRIPTION OF THE INVENTION

Figure 1:
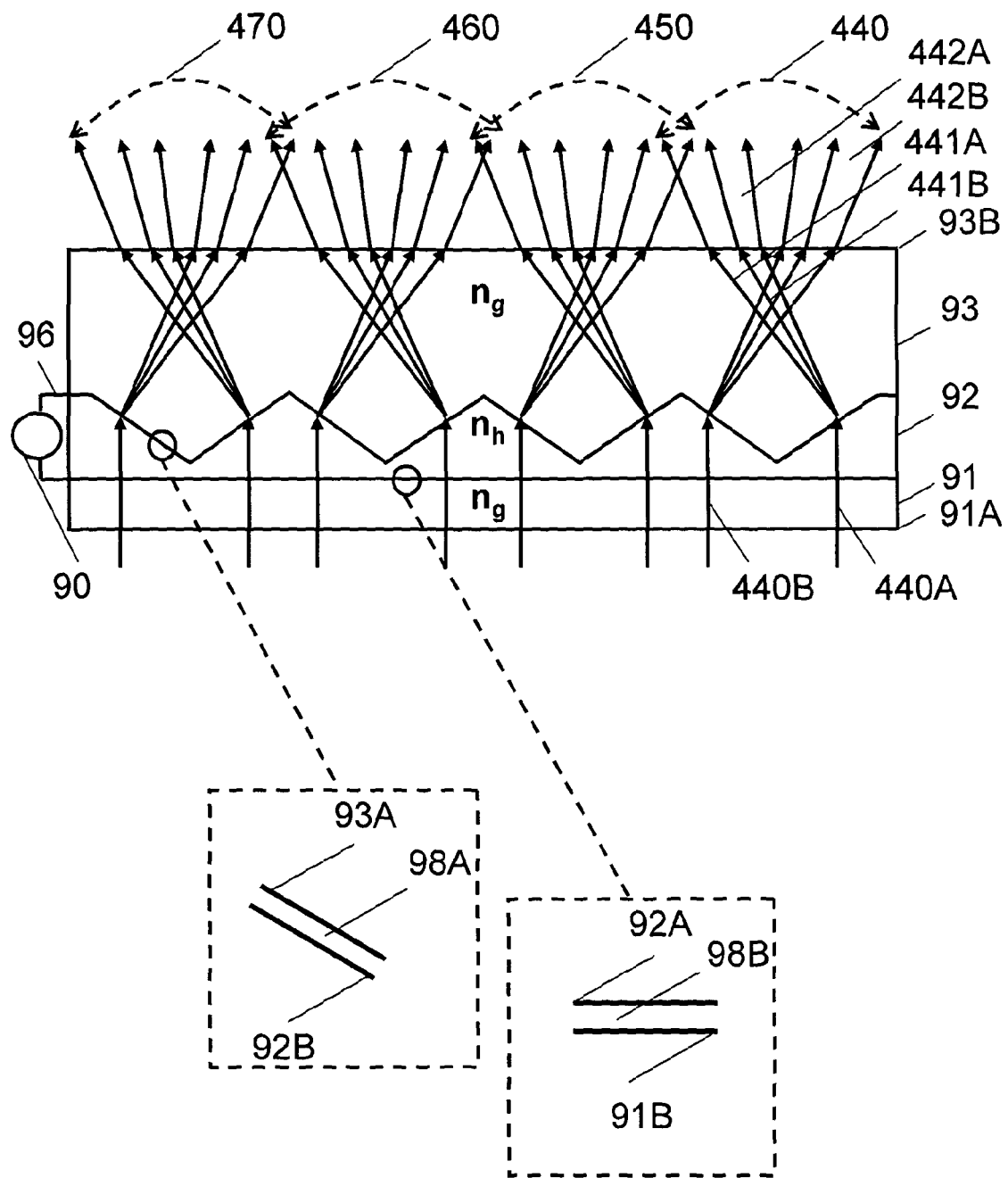
FIG. 1 is a schematic side elevation view of a micro scanner.

It an object of the present invention to provide a despeckler with improved speckle contrast reduction.

It will be apparent to those skilled in the art that the present invention may be practiced with only some or all aspects of the present invention as disclosed in the following description. For the purposes of explaining the invention well-known features of laser technology and laser displays have been omitted or simplified in order not to obscure the basic principles of the invention.

Parts of the following description will be presented using terminology commonly employed by those skilled in the art of optics and laser displays in particular.

In the following description the terms light, ray, beam and direction will used interchangeably and in association with each other to indicate the propagation of light energy along rectilinear trajectories.

Unless otherwise stated the term optical axis in relation to a ray or beam direction refers to propagation parallel to an axis normal to the surfaces of the optical components described in relation to the embodiments of the invention.

It should also be noted that in the following description of the invention repeated usage of the phrase "in one embodiment" does not necessarily refer to the same embodiment.

The despeckler embodiments disclosed herein are directed at overcoming both objective and subjective speckle. The devices generate set of unique speckle patterns within an eye resolution cell by operating on the angular characteristic of rays propagating through the despeckler according to the angular diversity principle.

Specifically the invention provides a despeckler that combines a means for generating illumination light with a temporally varying random distribution of ray directions to be referred to as a micro scanner with a holographic means for generating a diffuse illumination patch at a specified location. Said holographic means will be referred to as a holographic diffuser in the following description of the invention. The location of the diffuse illumination patch typically coincides with the surface of a microdisplay but in some display applications it may be advantageous for it located at or near to an intermediated image plane.

The invention provides a solid state analogue of the classical moving-screen speckle reduction technique. The holographic means for creating a diffuse illumination patch also provides a means for shaping the beam cross section and controlling the spatial homogeneity of the illumination all of said features being encoded within a single hologram.

We start by considering the micro scanner. The basic principles of a micro scanner for use with the invention are illustrated in the schematic side elevation view of FIG. 1. The apparatus comprises: a first transparent optical substrate 91 with an input surface 91A and an output surface 91B and a second transparent optical substrate 93 with an input surface 93A and an output surface 93B. The input surface of the second substrate 93 is configured as an array of prismatic elements each prismatic element containing surfaces such as 93A. Advantageously, at least one of the input surface of the first substrate or the output surfaces of the second substrate is planar. Transparent electrodes 98A,98B are applied to the output surface 91B of said first substrate and the input surface 93A of said second substrate. A variable refractive index layer to 92 having input surfaces 92A,92B is sandwiched between the output surface of the first substrate and the output surface of the second substrate providing an array of variable refractive index prismatic elements. Advantageously the variable refractive index layer is a HPDLC material. In one embodiment of the invention the variable refractive index layer is a SBG. In one embodiment of the invention the variable refractive index layer is a sub wavelength grating. The insets marked by dashed lies show portions of the first substrate-electrode-HPDLC layer interface and the second substrate-electrode-HPDLC layer interface in more detail. The electrodes are coupled to a voltage generator 90 by means of an electrical circuit 99. The input surface 91A of the first substrate 91 is optically coupled to a laser source which is not illustrated. The substrates are fabricated from an optical glass such as BK7. Alternatively, optical plastics may be used.

We consider the propagation of light through one of the prismatic elements. Input laser light indicated by the rays 440A,440B is transmitted through substrate 91 into the HPDLC. Refracted rays from a first prism surface 93B are indicated by 441A and refracted rays from a second prism surface are indicated by 441B. Each of the refracted rays in the groups indicated by 441A,441B corresponds to a unique average refractive index resulting from a unique applied voltage. The rays 441A,441B are refracted at the output surface of the second substrate 93 to provide the output rays 442A,442B. As indicated in the drawing each prism will provide overlapping rays indicated by the divergent ray bundles 440,450,460, 470.

Figure 2:
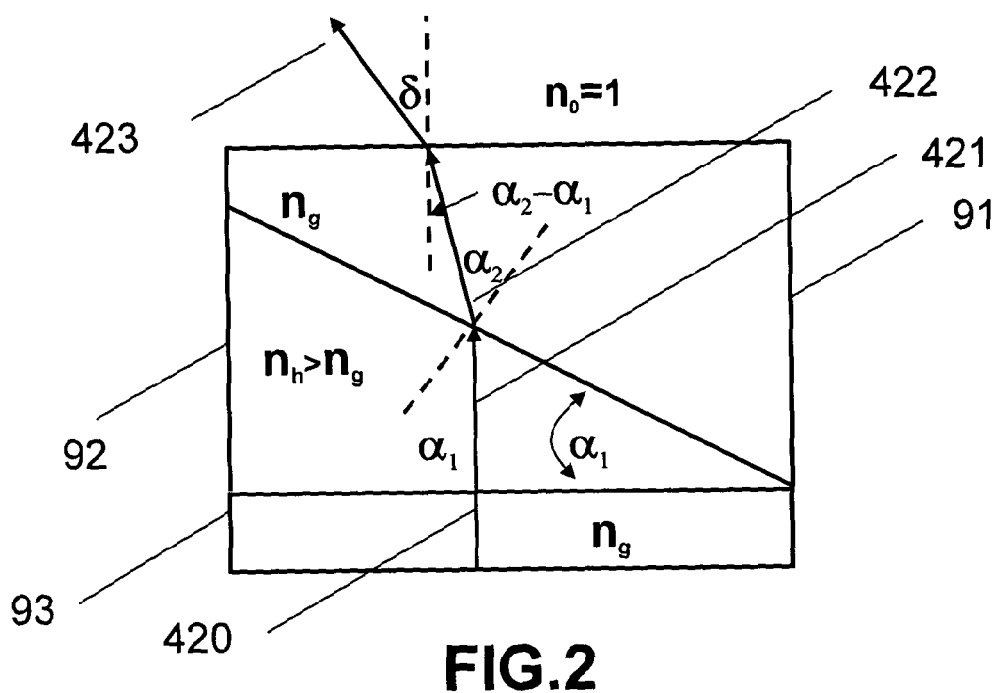
FIG. 2 is a schematic side elevation view of one aspect of a micro scanner.

The ray geometry is illustrated in more detail in FIG. 2 which provides a schematic illustration of the ray propagation around one prism face. The angle of deflection in the prism is given by $\alpha_2 = \arcsin((n_h/n_g)\sin(\alpha_1))$, which is approximately equal to $(n_h/n_g)\alpha_1$. The prism angle $\alpha_1$ is given by $\alpha_1 = \arctan(h/D)$, where D is the length of the prism (or period) and h is its height. It can be shown that the resulting angle of prism deflection $\delta$ is given by $\delta = \arcsin(n_g \sin(\alpha_2 - \alpha_1))$. Making the approximation that $\delta = n_g(\alpha_2 - \alpha_1)$, we obtain: $\delta = n_g \alpha_2 (n_h/n_g - 1)$. Combining both previous equations, the deflection angle may be expressed as a function of the prism characteristics and index. Based on the above equations the ray deflection is given by $\delta = n_g((h/D)(n_h/n_g - 1))$. The directions of the output rays are swept by increasing the effective refractive index in the HPDLC between the substrate-HPDLC index match condition and the full effective index shift. Typically, the index of glass is $n_g = 1.55$. The index of the HPDLC $n_h$ in its non diffracting state is matched to the index of the substrate glass which is typically 1.55. The inventors have found that the maximum refractive variation of the HPDLC is typically +0.065. The HPDLC material has a sinusoidal sub-wavelength grating with a duty cycle of 50% of the index swing regions (bright fringes). Therefore the maximum effective refractive index change extends from 1.55 to 1.55+0.065/ 2=1.5825. Assuming a prism height of 1 micron, a prism length of 30 microns, and $n_g = 1.55$ and $n_h = 1.5825$, we obtain a deflection angle of 0.062 degrees.

Figure 3:
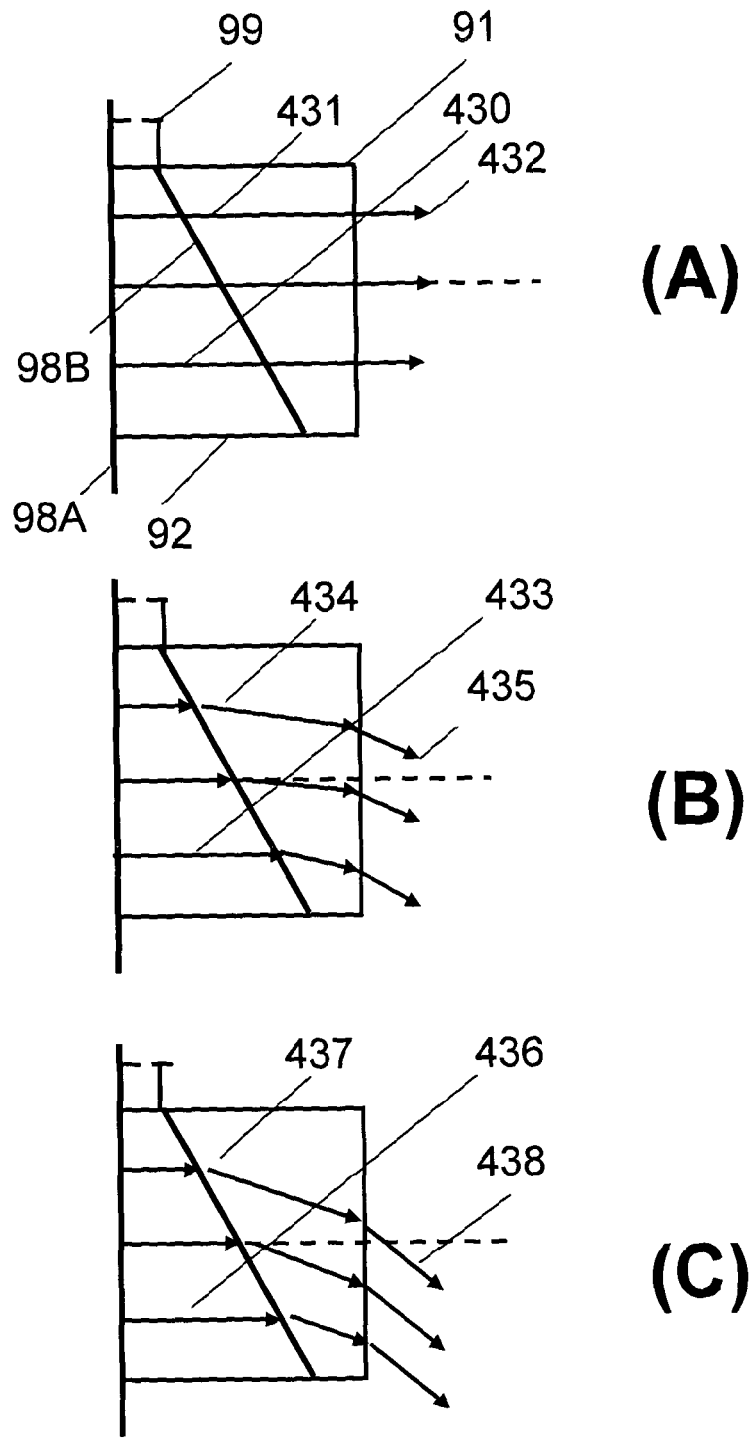
FIG. 3A is a schematic side elevation view of a first aspect of a micro scanner.
FIG. 3B is a schematic side elevation view of a second aspect of a micro scanner.
FIG. 3C is a schematic side elevation view of a third aspect of a micro scanner.

FIG. 3 illustrates the sweeping of output rays as the voltage applied across the HPDLC via the electrodes 98A,98B is varied. At the maximum voltage condition illustrated in FIG. 3A there is nor deflection in the incoming rays 430 which propagate into the from the HPDLC region 92 into region 93 as the rays 431 and subsequently into air as rays 432 without deviation. FIGS. 3B-3C show how the ray deviation increases as the voltage is reduced. In FIG. 3B input collimated light 433 is deflected into the ray directions 434 in the HPDLC medium and into ray direction 435 in air. In FIG. 3C input collimated light 436 is deflected into the ray directions 437 in the HPDLC medium and into ray direction 438 in air.

In one embodiment of the invention both of the transparent electrodes are continuous. The HPDLC is selectively switched in discrete steps from a fully diffracting to a non diffracting state by an electric field applied across the transparent electrodes.

At least one of said transparent electrodes is patterned to provide independently switchable electrode elements such that portions of the HPDLC may be selectively switched in discrete steps from a fully diffracting to a non diffracting state by an electric field applied across the transparent electrodes. Desirably, the electrodes are fabricated from ITO.

Figure 4:
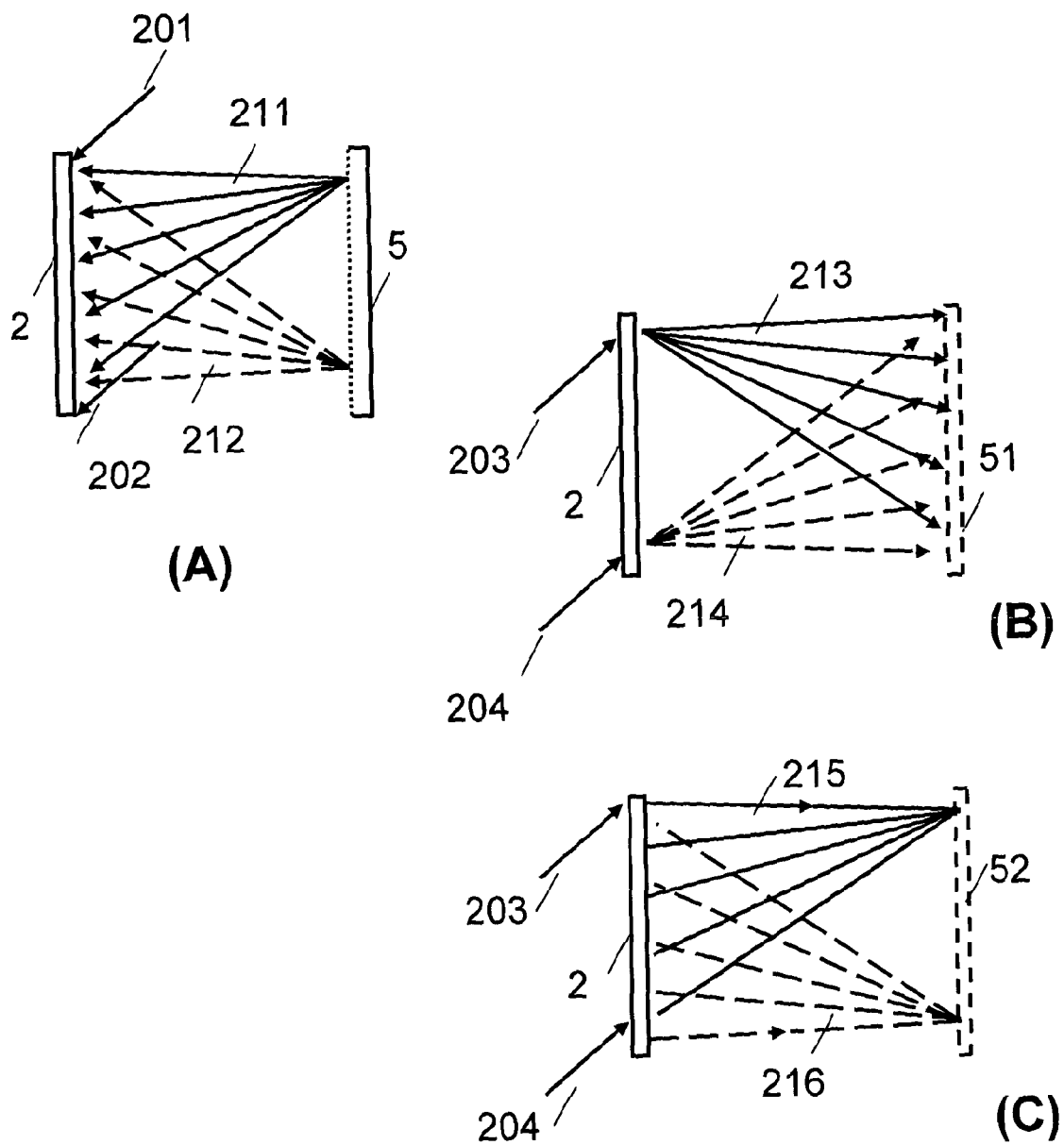
FIG. 4A is a schematic view illustrating a method of recording a holographic diffuser.
FIG. 4B is a schematic view of a first aspect of the operation of a holographic diffuser.
FIG. 4C is a schematic view of a second aspect of the operation of a holographic diffuser.

We next consider the principles of and method of recording of the holographic diffuser referring to FIGS. 4A-4C. The beam shaping device is essentially a hologram of a diffuser or scatter plate. Using a traditional holographic recording procedure, which is illustrated schematically in FIG. 4A, the holographic diffuser is recorded by illuminating a holographic recording medium 2A by light scattered from a real diffuser 5 and a second collimated reference beam indicated by the rays 201,202. Advantageously, the rays 201,202 are parallel. Groups of rays from two points on the diffuser are generally indicated by 211 and 212. Each group of rays from a point on the diffuser surface fills the aperture of the hologram. Under playback the processed hologram indicated by 2B is illuminated by a beam parallel to the reference beam such that the hologram forms a static image of the diffuser. Every point of the diffuse illumination patch reproduces each divergent point of the diffuser. Two equivalent interpretations may be used to characterise the formation of a diffuse illumination patch by the hologram. Referring to FIG. 4A it will be seen that each point on the hologram diffracts incident light into the entire area of the diffuse illumination patch. On the other hand, referring to FIG. 4B, it will be seen that in this case each point in the diffuse illumination patch receives light from the entire area of the hologram. It will be clear to those skilled in the art of holographic optics that other optical configurations may be used to form a diffuse illumination patch that exists at any location in front of or behind the holographic diffuser. It should also be apparent that the same principles may be used to provide a holographic diffuser based on reflection holograms. Whichever interpretation is used, the effect is to provide random spatio temporal averaging of the speckle pattern, multiple speckle patters are superimposed and the speckle contrast is decreased. If the hologram is now illuminated by light from the micro scanner each point on the hologram is illuminated by rays having random incident angles covering a small angular sweep. This is equivalent to the classical displaced diffuser approach.

Figure 5:
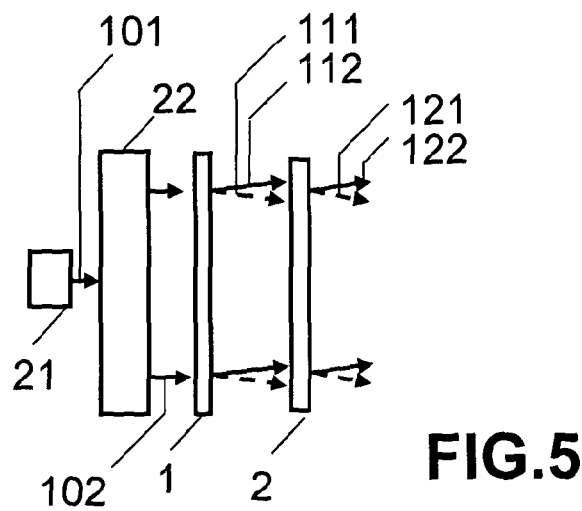
FIG. 5 is a schematic side elevation view of a despeckler according to one embodiment of the invention.

In one embodiment of the invention illustrated in the schematic side elevation view of FIG. 5 a despeckler comprises a micro scanner 1 based on the principles described above, a holographic diffuser 2 based on the principles described above. The micro scanner is illuminated by light from a laser 21 which is expanded and collimated by the beam coupling optics 22. The beam coupling optics typically includes a beam expander and collimator together with means such as a grating or prism for optically coupling the laser beam to the micro scanner. Specifically, the light from the laser indicated by 101 is expanded and collimated to provide the beam indicated by 102. The invention does not assume any particular optical design for the beam coupling optics. The micro scanner deflects the beam 102 in small angular sweeps of random amplitude indicated by 111,112 according to the principles discussed above. The holographic diffuser then diffracts light to form a diffuse illumination patch as discussed above.

Figure 6:
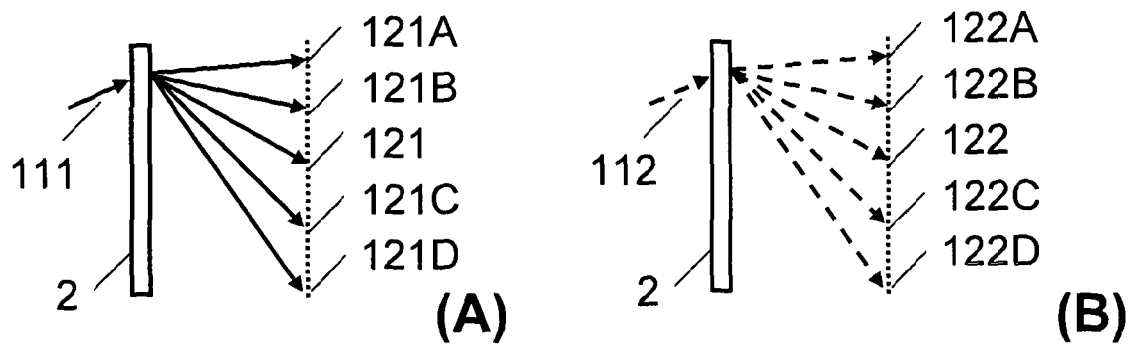
FIG. 6A is detail of the operation of a despeckler according to one embodiment of the invention.
FIG. 6B is detail of the operation of a despeckler according to one embodiment of the invention.

FIGS. 6A-6B illustrates the operation of the diffuse illumination patch in more detail. In FIG. 6A illumination from a collimated beam in the ray direction 111 resulting in the diffracted ray group 121A-121D which is uniformly distributed around the average ray direction 121. FIG. 6B illustrates the ray paths follow when the incidence beam being swept to the ray direction 112 resulting in the diffracted ray group 122A-122D which is uniformly distributed around the average ray direction 122. Each position on the incident rays sweep gives rise to a unique diffuse ray distribution across the diffuse illumination patch. Superposing and temporally integrating the set of such patterns generated by the full incident ray sweep over the eye integration time results in a reduction of the speckle contrast.

Figure 7:
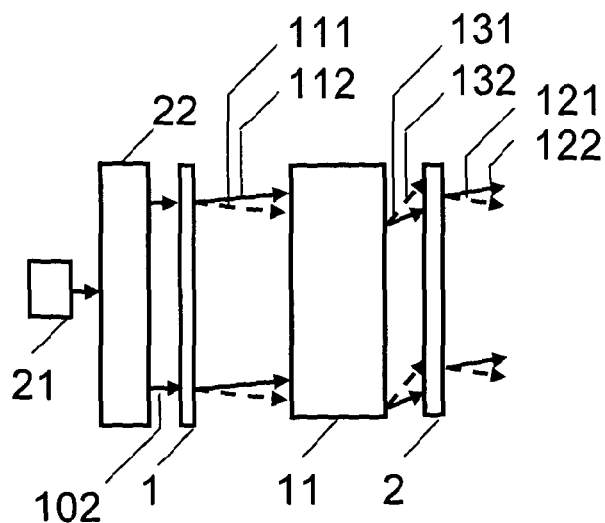
FIG. 7 is a schematic side elevation view of despeckler according to one embodiment of the invention.

In one embodiment of the invention illustrated in the schematic side elevation view of FIG. 7 the despeckler of FIG. 5 further comprises a beam steering means for directing the output ray angles 111,112 from the micro-scanner into the input angles 131,132 required by the holographic diffuser. Typically, the holographic diffuser will require off-axis incidence angles. Advantageously, the beam steering means is a diffractive device based on Bragg gratings. However, other means for steering the beams into the required angles will be apparent to those skilled in the art.

Figure 8:
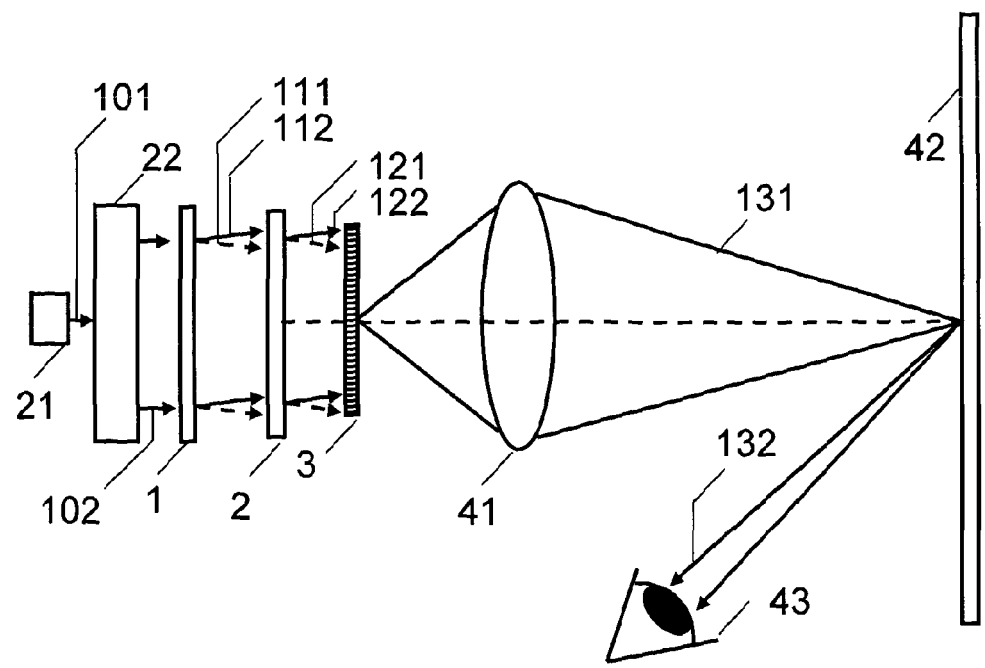
FIG. 8 is a schematic side elevation view of a projection display incorporating a despeckler according to one embodiment of the invention.

In one embodiment of the invention illustrated in the schematic side elevation view of FIG. 8 a projector incorporating the despeckler of FIG. 5 further comprises a microdisplay 3 a projection lens 41 and a screen 42 which is observed from an eye position indicated by the symbol 43.

Figure 9:
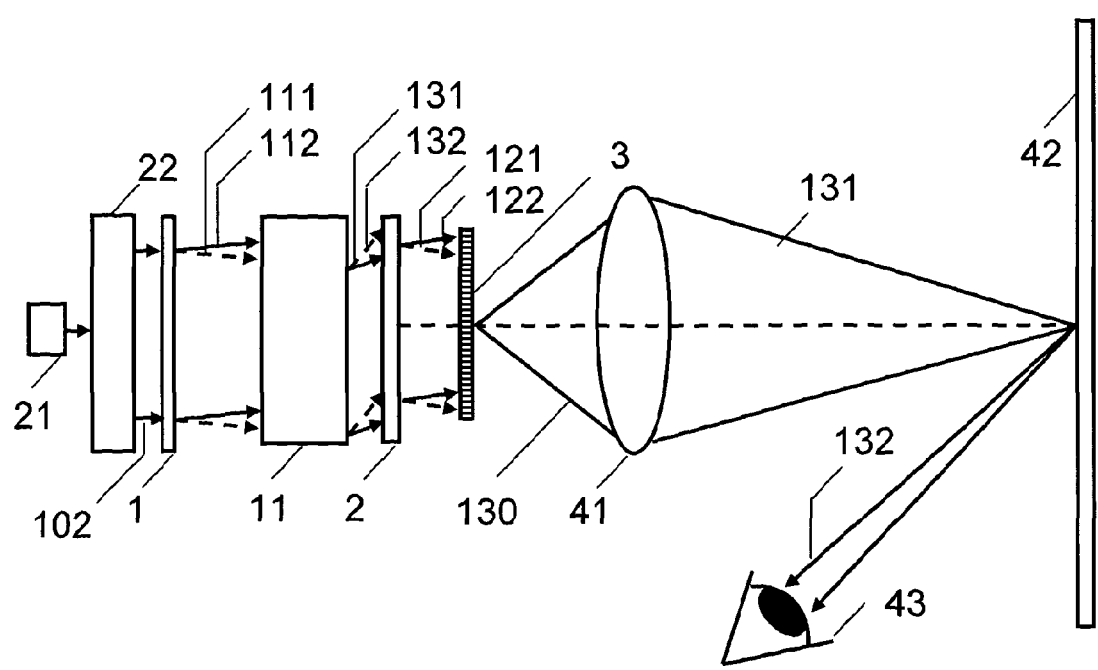
FIG. 9 is a schematic side elevation view of a projection display incorporating a despeckler according to one embodiment of the invention.

In one embodiment of the invention illustrated in the schematic side elevation view of FIG. 9 a projector incorporating the despeckler of FIG. 7 further comprises a microdisplay 3 a projection lens 41 and a screen 42 which is observed from an eye position indicated by the symbol 43.

Advantageously, each point in the holographic diffuser diffracts light into the maximum available area of the diffuse illumination patch, as defined by the active area of a microdisplay, for example. In some embodiments of the invention it may be sufficient for light diffracted from any point to fill only a portion of the maximum available area. Easing the diffraction angle range will generally make the hologram prescription less demanding.

Figure 10:
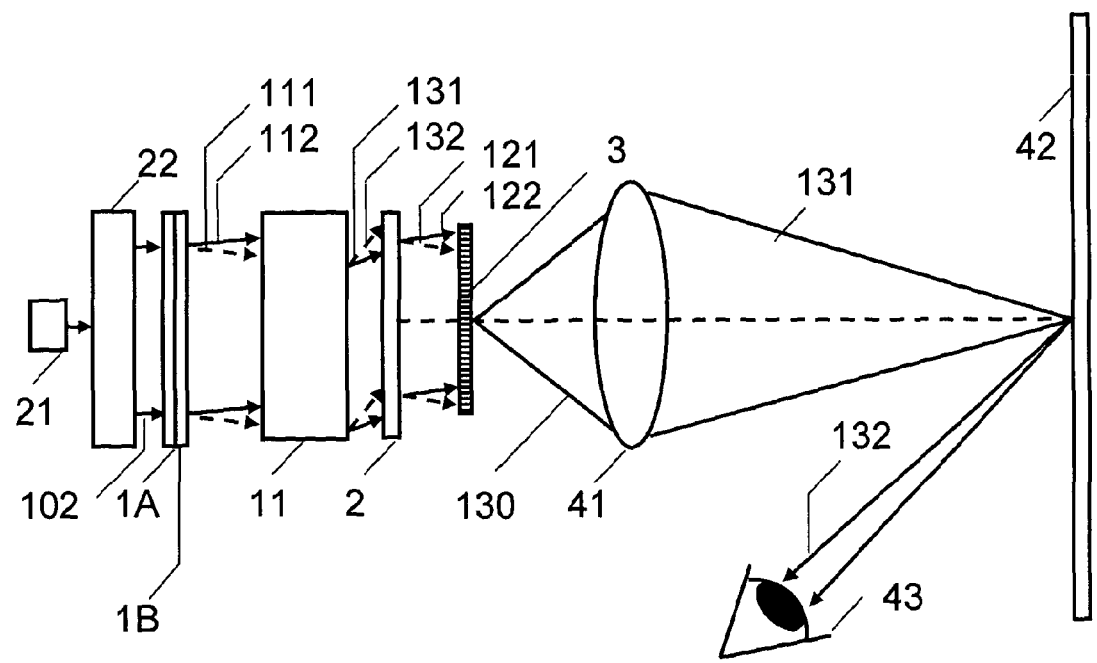
FIG. 10 is a schematic side elevation view of a projection display incorporating a despeckler according to one embodiment of the invention.

In one embodiment of the invention illustrated in the schematic side elevation view of FIG. 10 two micro scanners 1A,1B of identical prescriptions are provided. The micro scanners are stacked and operated independently. The number of micro scanners that can be stacked in this way is limited only by the transmission losses incurred by the substrates, HPDLC and ITO. Speckle reduction increases with the number of layers.

Figure 11:
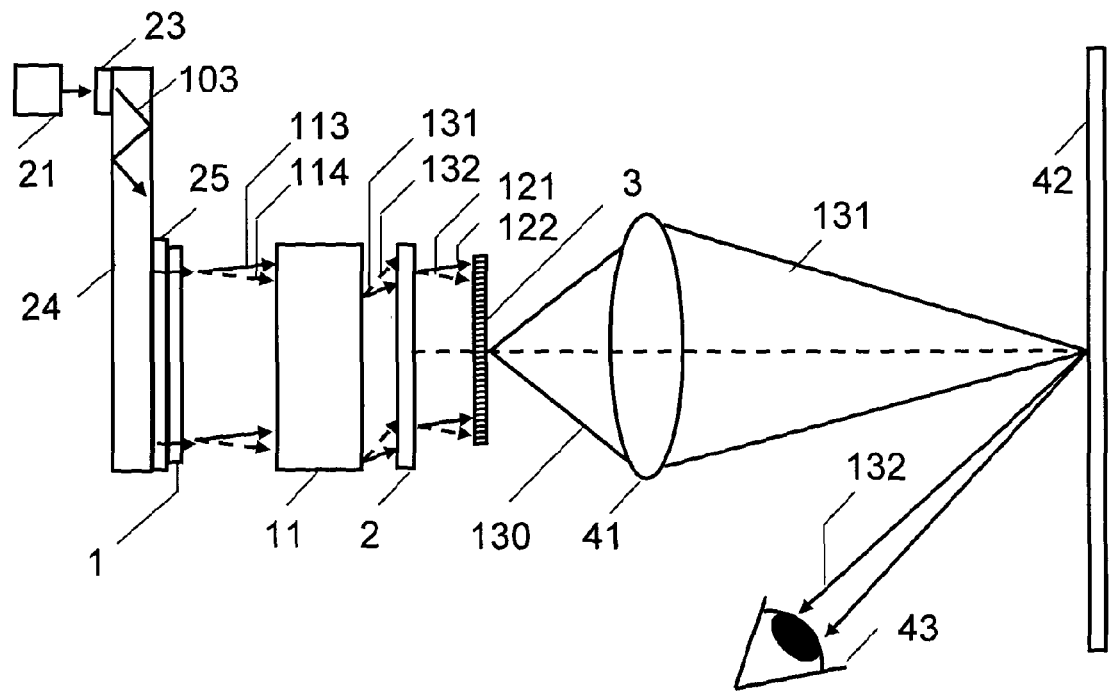
FIG. 11 is a schematic side elevation view of a projection display incorporating a despeckler according to one embodiment of the invention.

In one embodiment of the invention illustrated in the schematic side elevation view of FIG. 11 the beam coupling optics comprises a TIR lightguide 24. A coupling grating 23 admits collimated light from the laser 21 into a TIR path indicated by 103. A second coupling grating 25 directs light into the micro scanner. A TIR lightguide may be used to couple in light from RGB laser sources or multiple monochromatic sources depending on the application.

In one embodiment of the invention the holographic diffuser is a CGH.

In one embodiment of the invention the holographic diffuser is recorded into a HPDLC using the same procedure as described above. In this case the holographic diffuser can be switched on and off.

In one embodiment of the invention in which the holographic diffuser is recorded into a HPDLC the holographic diffuser may be configured as an array of selectively switchable diffuser elements recorded each operating according to the above principles.

In one embodiment of the invention the holographic diffuser also encodes the properties of beam shaping and homogenization. The principles are known to those skilled in the art of diffractive optical element design. The holographic diffuser is made by fabricating a CGH with the required optical properties and recording the CGH into the holographic diffuser. (essentially forming a hologram of the CGH).

Figure 12:
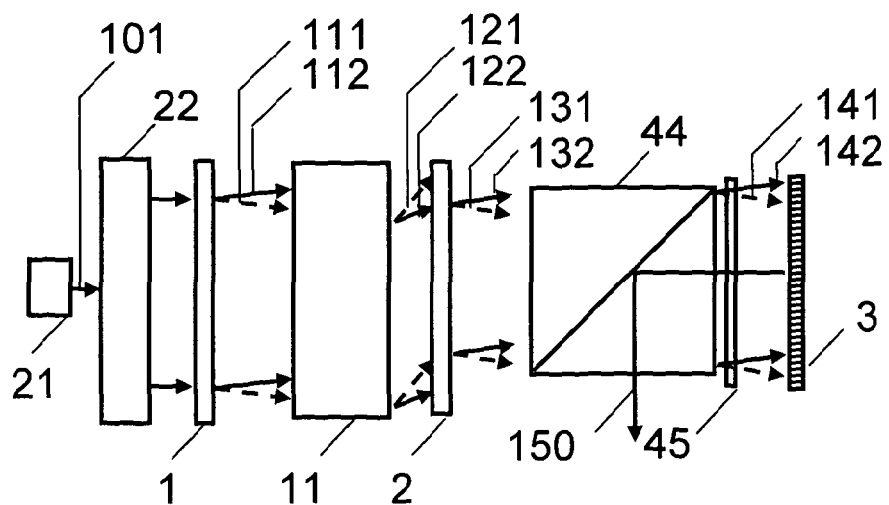
FIG. 12 is a schematic side elevation view of despeckler for use with a reflective microdisplay according to one embodiment of the invention.

In one embodiment of the invention illustrated in FIG. 12 there is provided a despeckler for use with a reflective display. The despeckler is similar to the embodiment of FIG. 7 but further comprise a polarizing beamsplitter 44 and a quarter wave plate 45. Linearly polarized light from the laser is transmitted through the micro scanner, beam coupling optics and holographic diffuser as described above to provide illumination light 131,132. The illumination light is transmitted through the polarizing beamsplitter transmitted through the quarter wave plate reflected at the microdisplay and transmitted once again through the quartet wave plate emerging with polarization orthogonal to that of the incident light and is then reflected at the polarizing beam splitter towards projection lens which is not illustrated. The entire reflected light path is indicated by 150. In the case of a liquid crystal display panel the quarter wave plate will not be required.

The inventors have found that micro scanner according to the principles described above is polarization sensitive.

Figure 13:
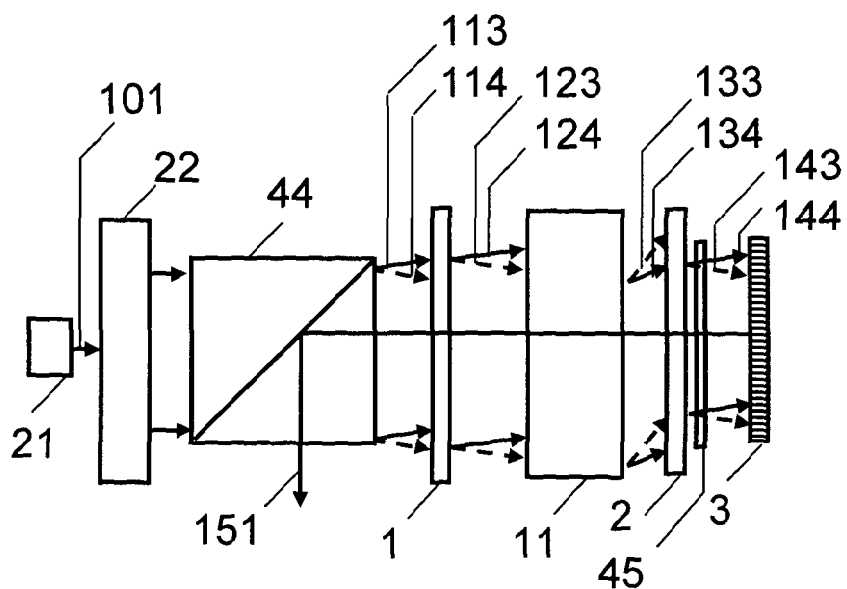
FIG. 13 is a schematic side elevation view of despeckler for use with a reflective microdisplay according to one embodiment of the invention.

In one embodiment of the invention illustrated in FIG. 13 there is provided a further despeckler for use with a reflective microdisplay. The despeckler is similar to the embodiment of FIG. 5 but further comprise a polarizing beamsplitter 44 and a quarter wave plate 45. Linearly polarized light from the laser is transmitted through the polarization beam splitter, micro scanner, and holographic diffuser as described above to provide illumination light 131,132. The illumination light is transmitted through the quarter wave plate reflected at the microdisplay and transmitted once again through the quartet wave plate, holographic diffuser and micro scanner and is then reflected at the polarizing beam splitter towards projection lens which is not illustrated. The entire reflected light path is indicated by 151. In this embodiment of the invention the holographic diffuser will ideally be sensitive to the same polarization as the micro scanner.

In one embodiment of the invention the electrode elements of the micro scanner have substantially the same cross sectional area as a prismatic element.

In one embodiment of the invention the centre of said electrode element of the micro scanner overlaps the vertex of a prismatic element.

In one embodiment of the invention the centre of an electrode element of the micro scanner is offset from the vertex of a prismatic element.

In one embodiment of the invention the prism array of the micro scanner is a linear array of elements of triangular cross section as illustrated in FIG. 1.

In one embodiment of the invention the prism array of the micro scanner is a two-dimensional array comprising pyramidal elements of cross section similar to the one illustrated in FIG. 15. In such an embodiment ray deflections occur in two directions.

In one embodiment of the invention the prismatic elements of the micro scanner are identical. Such an embodiment of the invention is also illustrated by FIG. 1.

In one embodiment of the invention the surface angles of the prismatic elements of the micro scanner have a random distribution. Such an embodiment of the invention is also illustrated by FIG. 1.

In one embodiment of the invention the prismatic elements of the micro scanner are each characterised by one of at least two different surface geometries. Such an embodiment of the invention is also illustrated by FIG. 1.

In one embodiment of the invention the prismatic elements of the micro scanner are each characterised by one of at least two different surface geometries with the prismatic elements of each surface geometry being distributed uniformly across the prism array.

In one embodiment of the invention the prismatic elements of the micro scanner have diffusing surfaces.

In one embodiment of the invention the laser source comprises red green and blue emitters.

The invention is not restricted to any particular laser source configuration. The HPDLC drive electronics are not illustrated. The apparatus may further comprise relay optics, beam folding mirrors, light integrators, filters, prisms, polarizers and other optical elements commonly used in displays The present invention does not assume any particular process for fabricating Sdespeckler devices. The fabrication steps may be carried out used standard etching and masking processes. The number of steps may be further increased depending on the requirements of the fabrication plant used. For example, further steps may be required for surface preparation, cleaning, monitoring, mask alignment and other process operations that are well known to those skilled in the art but which do not form part of the present invention It will be clear from the above description of the invention that the despeckler embodiments disclose here may be applied to the reduction of speckle in a wide range of laser displays including front and rear projection displays, wearable displays, scanned laser beam displays and transparent displays for use in viewfinders and HUDs.

The invention is not limited to any particular type of HPDLC or recipe for fabricating HPDLC. The HPDLC material currently used by the inventors typically switches at 170 us and restores at 320 us. The inventors believe that with further optimisation the switching times may be reduced to 140 microseconds.

It should be emphasized that the Figures are exemplary and that the dimensions have been exaggerated. For example thicknesses of the HPDLC layers have been greatly exaggerated.

The HPDLC may be based on any crystal material including nematic and chiral types.

In particular embodiments of the invention any of the HPDLC devices discussed above to may be implemented using super twisted nematic (STN) liquid crystal materials. STN offers the benefits of pattern diversity and adoption of simpler process technology by eliminating the need for the dual ITO patterning process described earlier.

The invention may also be used in other applications such as optical telecommunications Although the invention has been described in relation to what are presently considered to be the most practical and preferred embodiments, it is to be understood that the invention is not limited to the disclosed arrangements, but rather is intended to cover various modifications and equivalent constructions included within the spirit and scope of the invention.

What is claimed is:

1. An apparatus for reducing laser speckle comprising:
   a micro scanner and a holographic diffuser,
   wherein said micro scanner comprises:
   a first transparent optical substrate with an input surface and an output surface;
   a second transparent optical substrate with an input surface and an output surface;
   a variable refractive index layer sandwiched between said output surface of said first substrate and said output surface of said second substrate; and
   transparent electrodes applied to said output surface of said first substrate and said input surface of said second substrate,
   wherein said input surface of said first substrates is optically coupled to a laser source,
   wherein said input surface of said second substrate is configured as an array of prismatic elements,
   wherein at least one of said transparent electrodes is patterned into independently addressable electrode elements,
   wherein the average refractive index of any region of said variable refractive index layer is proportional to a voltage applied across the electrode elements sandwiching said region, said micro scanner deflects input light from said laser source into output light at a first predefined range of angles, wherein said angles are determined by the refractive index of said substrates and the average refractive index of said variable refractive index layer,
   wherein the voltage applied across each said of the electrode elements is varied temporally,
   wherein each point in said holographic diffuser diffracts incident light rays of said first predefined range of angles into output light rays having a second predefined range of angles such that a diffuse illumination patch is produced at any surface intercepting said output light rays.

2. The apparatus of claim 1 wherein said variable refractive index layer is a subwavelength grating.

3. The apparatus of claim 1 wherein said variable refractive index layer is a holographic polymer dispersed liquid crystal material.

4. The apparatus of claim 1 wherein said variable refractive index layer is a switchable Bragg grating.

5. The apparatus of claim 1 wherein said diffuse illumination patch is is disposed in proximity to the surface of a microdisplay.

6. The apparatus of claim 1 wherein said diffuse illumination patch is disposed in proximity to the surface of a projection screen.

7. The apparatus of claim 1 wherein said holographic diffuser comprises a hologram of a scattering surface.

8. The apparatus of claim 1 wherein said holographic diffuser comprises a multiplicity of holograms of scattering surfaces.

9. The apparatus of claim 1 wherein said holographic diffuser is Bragg hologram.

10. The apparatus of claim 1 wherein said holographic diffuser is a SBG.

11. The apparatus of claim 1 wherein said holographic diffuser is a computer generated hologram.

12. The apparatus of claim 1 wherein said holographic diffuser encodes properties for varying the intensity distribution of said output light.

13. The apparatus of claim 1 wherein said holographic diffuser encodes properties for shaping the cross sectional geometry of said output light.

14. The apparatus of claim 1 further comprising a beam steering means for directing output light from said microscanner into said first predefined range of angles.

15. The apparatus of claim 1 wherein light from said source is coupled into said microscanner by means of apparatus comprising a lightguide.

16. The apparatus of claim 1 wherein light from said source is coupled into said microscanner by means of apparatus comprising at least one grating.

\* \* \* \* \*

UNITED STATES PATENT AND TRADEMARK OFFICE
CERTIFICATE OF CORRECTION

PATENT NO.        : 9,274,349 B2
APPLICATION NO.   : 14/009637
DATED             : March 1, 2016
INVENTOR(S)       : Milan Momcilo Popovich et al.

It is certified that error appears in the above-identified patent and that said Letters Patent is hereby corrected as shown below:

In the Claims

Column 12, Line 25, Claim 1:

After "voltage applied across each"
Delete "said".

Signed and Sealed this
Twenty-first Day of June, 2016

Michelle K. Lee
*Director of the United States Patent and Trademark Office*